3,517,384
LOW BEAM SIGNALING APPARATUS
Raymond C. Jablonski, 1879 Coventry Drive,
Memphis, Tenn. 38127
Filed Apr. 23, 1968, Ser. No. 723,458
Int. Cl. B60g 1/46, 1/50
U.S. Cl. 340—83                                    2 Claims

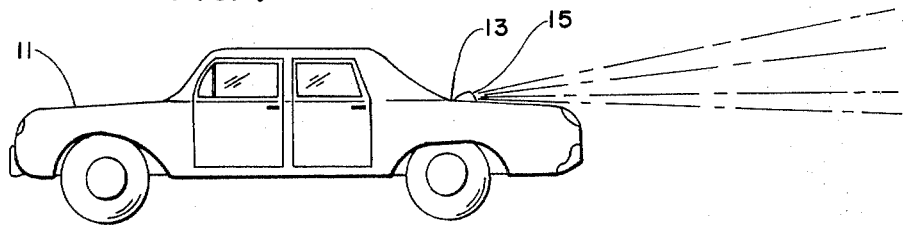
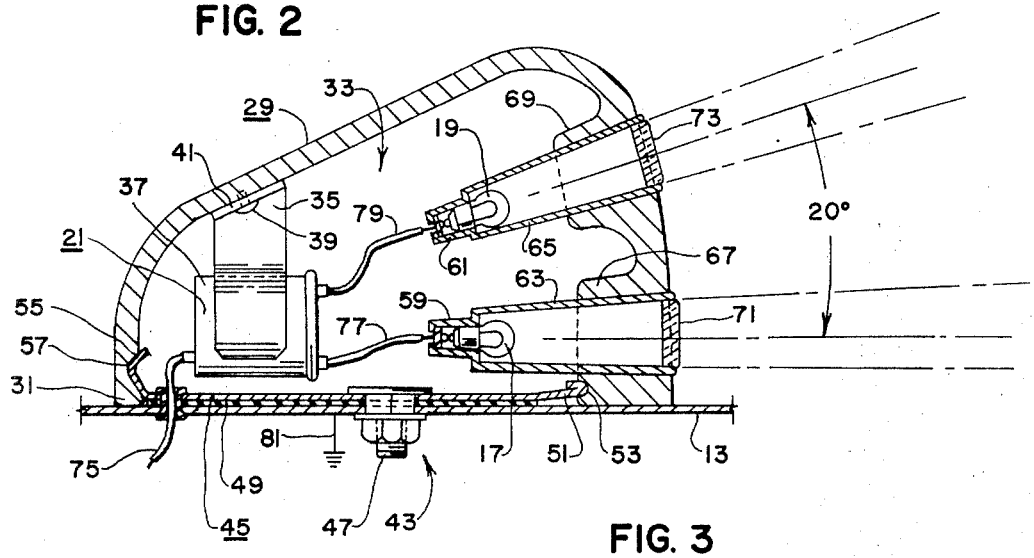
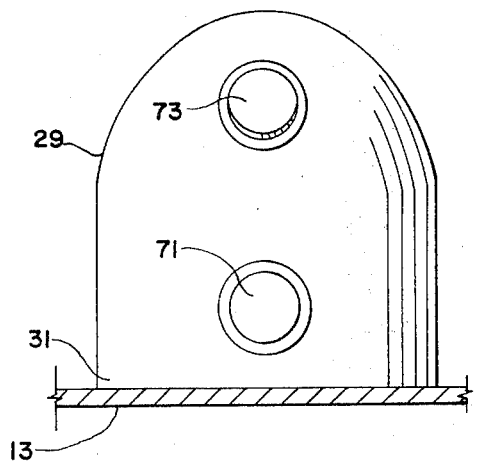
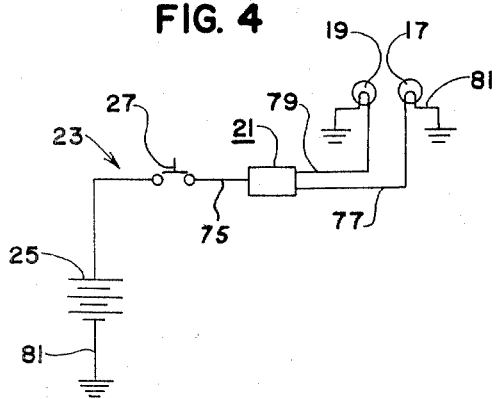

ABSTRACT OF THE DISCLOSURE

Apparatus adapted to be installed on a leading automobile for signaling the driver of a trailing automobile to dim or lower the headlights of the trailing automobile thereby to eliminate rear view mirror glare in the eyes of the driver of said leading automobile, and including electrical structure for projecting a pair of divergingly arranged light beams rearwardly from the leading automobile and toward the trailing automobile and including electrical automatically operative switch means for causing the light beams to be alternatingly consecutively emitted, the alternating light beams being observed by the driver of the trailing vehicle and reminding the driver to dim or lower the headlights of his vehicle.

BACKGROUND OF THE INVENTION

Field of the invention

It relates to automotive safety devices generally and particularly to signaling means in an automobile.

Description of the prior art

The typical manner of conveying information from one road vehicle to another road vehicle is through the use of illuminated lettered signs; a sign mounted on one vehicle is illuminated for transmitting information to the driver of another vehicle. Pat. No. 2,878,462 shows vehicle sign means such as this.

A particular disadvantage with transmitting information by illuminated lettered signs (as shown in the structure of Pat. No. 2,878,462) is the difficulty of reading the sign: Generally, unless very large-lettered sign means is utilized, it is difficult or impossible to read the message of the sign unless the trailing vehicle is running close behind the leading vehicle. A vehicle following close behind another vehicle of course presents a very hazardous driving practice.

Another disadvantage of transmitting information by lettered sign means is that in reading the illuminated sign, the driver's attention is diverted from controlling his automobile or his attention is divided between guiding his vehicle and reading the sign of the preceding vehicle. This also results in hazardous driving practices.

Apparently many of the prior art headlight controlling devices are basically in the form of auxiliary lamp units adapted to be removably secured on the automobile or placed on the ground and used as an emergency or trouble lamp when a vehicle becomes stalled on the highway. Multi-purpose auxiliary lamp devices as above-mentioned may provide many different functions. However, such auxiliary lamp devices as above-mentioned may not properly perform the specific function of reminding the driver of a following vehicle to lower the headlight beams of that vehicle when approaching the rear of a preceding vehicle.

SUMMARY OF THE INVENTION

The light beam emitting apparatus of the present invention includes a beam emitting unit adapted to be mounted on the rearward part of an automobile for projecting a pair of rearwardly directed alternating light beams. The light beam apparatus include manually operative switch means located near the driver of the automobile for selectively rendering the light beam emitting unit operative or inoperative. When a trailing automobile with bright lights overtakes or approaches a leading automobile from the rear, the driver of the leading automobile may close the electrical circuit of the light beam projecting apparatus and cause the beam emitting unit to be operative and to project the pair of diverging light beams rearwardly and toward the overtaking automobile. The alternating upwardly and downwardly projecting beams of light when viewed by the driver of the trailing automobile provides somewhat of a winking or blinking effect. The alternating beams of light also resemble somewhat the dimming of the headlights of an oncoming car and the driver of the trailing automobile psychologically responds to the alternating light beams and dims the lights of his automobile.

The low beam signaling apparatus of the present invention does not include lettered signs which transmit a legible message; the light beam emitting means of the present invention transmits a wordless message over a great distance, and an automobile overtaking the automobile with the signaling light beams of the present invention may understand the light beam message and dim the headlights of his automobile a great distance rearwardly of the leading automobile.

The low beam signaling apparatus of the invention does not include sign means for diverting the attention of the driver of the trailing automobile from the road. The driver of the trailing automobile is not distracted from driving by trying to read lettered signs on the leading automobile and such that results in hazardous driving. The light beam emitting unit which is fastened on the rearward part of the automobile is substantially small and inconspicious and does not distract from the silhouette or the pleasing design of the automobile.

BRIEF DESCRIPTION OF THE DRAWING

FIG. 1 is a side elevational view of an automobile having the signaling light beam emitting apparatus installed thereon.

FIG. 2 is an enlarged vertical plane longitudinal sectional view of the beam emitting unit of the invention.

FIG. 3 is a rear face view of the beam emitting unit.

FIG. 4 is a schematic view of the electrical components and wiring of the signaling light beam emitting apparatus.

DESCRIPTION OF THE PREFERRED EMBODIMENT

With reference to FIG. 1, the light beam emitting apparatus will be described in conjunction with an automobile 11 having a horizontal rearward panel 13. The light beam emitting apparatus of the invention includes a beam emitting unit 15 which houses first and second incandescent lamps 17, 19 and a thermo-electric switch assembly 21; and includes electrical circuit means 23 including the automobile battery 25 and manually operative switch means 27.

Beam emitting unit 15 includes a hollow, oblong housing 29 having rim structure 31 defining a downwardly opening interior 33. A bracket 35 embraces case 37 of switch assembly 21. A pin fastener 39 extending through bracket flange 41 and embeddedly secured in housing 29 firmly supports switch assembly 21 in interior 33 of housing 29.

Fastening means 43 removably fastens housing 29 on automobile 11 with rim structure 31 abuttingly engaging rearward panel 13 of the automobile. An elongated plate 45 is fixedly secured on automobile panel 13 by bolt means 47. An insulating strip 49 is interposedly secured between plate 45 and automobile panel 13. The rearward portion of plate 45 may be double bent to form a rearward end portion 51. A channel-like recess 53 formed in inside rearward portion of housing 29 is adapted to removably engage end 51 of plate 45. The forward end portion of plate 45 terminates in an upwardly extended nib 55 adapted to be removably received in housing recess 57. Housing 29 of beam emitting unit 15 is adapted to be removably secured on automobile panel 13 with end and nib portions 51, 55 of spring plate 45 frictionally engaging recesses 53, 57 of housing 29.

Incandescent lamps 17, 19 are removably fitted respectively in lamp sockets 59, 61 which are fixedly secured in turn on the smaller end portions respectively of reflector cones 63, 65. Reflector cones 63, 65 are frictionally secured respectively in annular bosses 67, 69 formed integrally with housing 29. Reflector cone 63 is preferably arranged horizontally and with the longitudinal axis thereof extending coincident with a horizontal plane lying parallel to the level of automobile 11. Reflector cone 65 is arranged obliquely with the longitudinal center axis thereof inclined upwardly approximately 20° from the axis of reflector cone 63. Light beam refracting means preferably is arranged in each reflector cone 63, 65 in the form of condensing lenses 71, 73. Lenses 71, 73 are secured across the open end respectively of reflector cones 63, 65 and provide means for directing the light rays emitted from unit 15 so that strong brilliant beams of light are provided.

Thermal-electric switch assembly 21 is typical and well known to those in the art. Switch assembly 21 is of the double pole single throw type switch which includes a bi-metal element, not shown, for automatically shifting the current from one pole to the other pole. Switch assembly 21 includes an input lead 75 and output leads 77, 79. First and second lamps 17, 19 are grounded respectively by suitable means, as through sockets 59, 61; reflector cones 63, 65; housing 29; bolt means 47; rearward panel 13 of automobile 11 and through ground lead conductor means 81 to battery 25.

Manually operative switch 27 is interposedly fitted in input lead 75 and provides on and off switch means for selectively rendering signaling light beam unit 15 operative or inoperative. Switch 27 is arranged within easy reach of the operator of automobile 11; and preferably is a spring loaded button operated normally open switch. The driver of automobile 11 may cause the alternating beam signal to be operative by pressing and holding switch 27 to a closed disposition which automatically shifts the current back and forth between lamps 17, 19; releasing the button of switch 27 breaks the circuit of conduit means 23 and renders the beam emitting apparatus inoperative.

When the driver of automobile 11 desires to signal the driver of a trailing or overtaking automobile to lower his headlight beams, the driver of automobile 11 has only to manipulate switch 27 to a closed disposition for a few moments or until the driver of the trailing vehicle responds to the alternating beams of light and dims the headlights of his automobile.

I claim:
1. A signaling light beam emitting apparatus adapted to be incorporated in the structure of a leading automobile for signaling the driver of a trailing automobile to dim the headlights of the trailing automobile comprising a first lamp, a second lamp, light reflecting means for causing a strong brilliant beam of light to be projected from each lamp, support structure firmly supporting said first and second lamps on the rearward part of said leading automobile with said first lamp being so positioned to project its light beam horizontally and in a rearward direction relative to said leading automobile and with said second lamp being so positioned to project its light beam obliquely in a vertical plane and in a direction rearwardly and upwardly relative to said leading automobile, electric circuit means for energizing said first and second lamps including automatically operative switch means for alternatingly consecutively energizing one and the other of said first and second lamps and including manual switch means interposed in said circuit means for selectively opening and closing the circuit means for selectively rendering said signaling light beam emitting apparatus operative or inoperative, a hollow housing enclosing and unitarily supporting said first and second lamps, said light reflecting means and said automatically operative switch means, and fastener means fastening said housing on a rearward part of the leading automobile.

2. The apparatus of claim 1 wherein said light reflecting means includes a first and a second reflector for projecting a beam of light respectively of said first and second lamps and wherein said first and second reflectors each are in the form of a hollow truncated slightly graduated reflector cone and with each cone being arranged respectively with its smaller end containing a respective lamp, and in which said apparatus additionally includes refractor lens means secured over the larger end opening respectively of each reflector cone and each lens functioning respectively to direct the light rays into a strong brilliant beam of light.

References Cited

UNITED STATES PATENTS

| | | | |
|---|---|---|---|
| 1,314,499 | 9/1919 | Brach | 340—50 |
| 2,137,319 | 11/1938 | Trautner et al. | 340—89 |
| 2,755,373 | 7/1956 | Berry | 340—119 X |
| 2,803,002 | 8/1957 | Bengtsson | 340—83 |
| 2,905,925 | 9/1959 | Whiteneck | 340—84 |
| 3,073,922 | 1/1963 | Miller | 340—52 X |
| 3,113,293 | 12/1963 | Breese et al. | 340—50 |
| 3,133,265 | 5/1964 | Fultz | 340—83 |
| 2,878,462 | 3/1959 | Tralli | 340—81 X |
| 3,441,906 | 4/1969 | Nielsen | 340—83 X |

THOMAS B. HABECKER, Primary Examiner
KENNETH N. LEIMER, Assistant Examiner

U.S. Cl. X.R.
340—87